May 10, 1949.

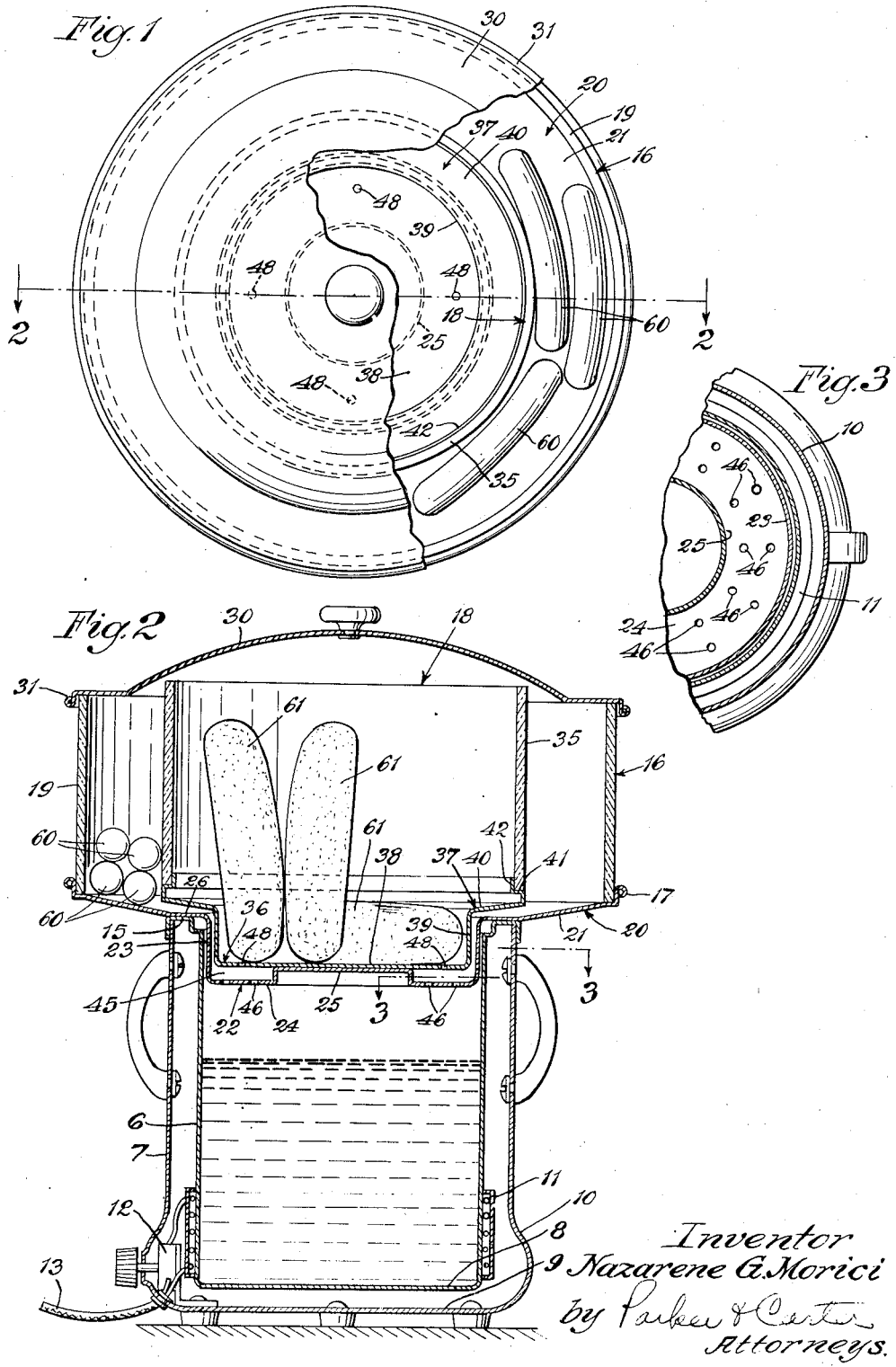

N. G. MORICI 2,469,778

COMBINED FRANKFURTER AND ROLL WARMING
AND CONDITIONING APPARATUS

Filed Feb. 10, 1949

Inventor
Nazarene G. Morici
by Parker & Carter
Attorneys

Patented May 10, 1949

2,469,778

UNITED STATES PATENT OFFICE 2,469,778

COMBINED FRANKFURTER AND ROLL WARMING AND CONDITIONING APPARATUS

Nazarene G. Morici, Chicago, Ill.

Application February 10, 1949, Serial No. 75,572

7 Claims. (Cl. 126—369)

This invention relates to improvements in warming and conditioning apparatus for frankfurters and buns or rolls, to maintain the frankfurters and rolls in proper heated and moist condition for the preparation of so-called "hot dogs."

One of the principal problems in the dispensing of hot dogs and similar edible sandwiches is that of keeping both the buns or rolls and the frankfurters, or other meat products used therewith, at the proper temperature while supplying considerably more steam vapor to the meat products than to the rolls or buns, so that the latter may be maintained in proper moist condition without becoming soggy.

Among the objects of this invention is to provide an improved form of warming and conditioning apparatus, including two warming compartments for containing the frankfurters and buns respectively, which compartments are normally in communication with each other but are supplied with different amounts of steam or steam vapor so that the warmed air in the frankfurter compartment can be maintained at considerably greater relative humidity than the bun compartment.

Other objects of the invention will appear from time to time as the following description proceeds.

The invention may best be understood by referring to the accompanying drawings, in which:

Figure 1 is a top plan view of one compartment of my invention with a part of the cover broken away.

Figure 2 is a sectional view taken on line 2—2 of Figure 1.

Figure 3 is an enlarged detail section taken on line 3—3 of Figure 2.

Figure 5:
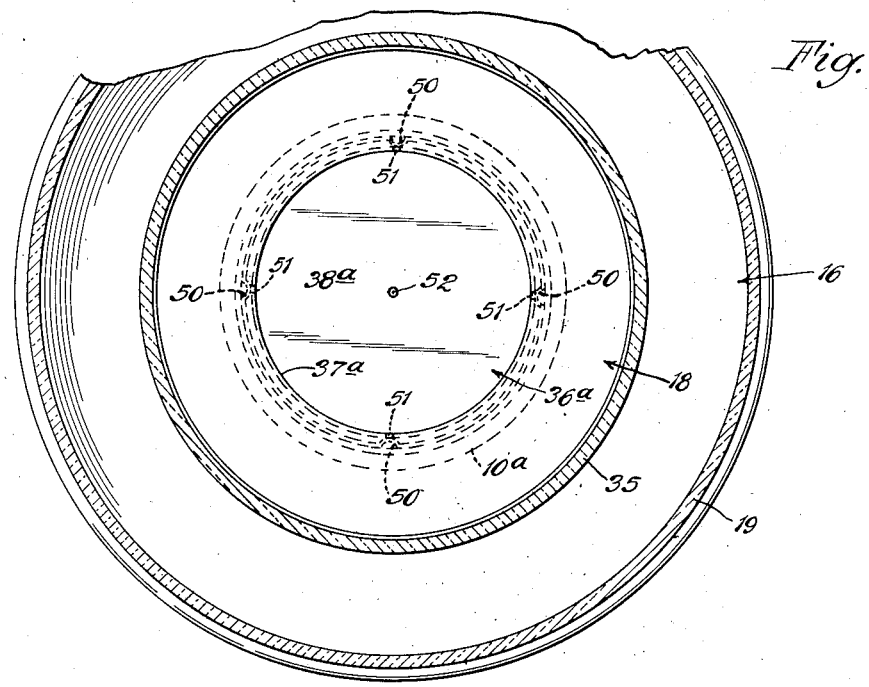
Figure 5 is a detail section taken on line 5—5 of Figure 4.

Referring now to the details of the embodiment of my invention illustrated in Figures 1 to 3, both inclusive, the conditioning apparatus is mounted on a hollow, double-walled, bowl-like base 10, having spaced inner and outer side walls 6, 7 and spaced bottom walls 8, 9 adapted for holding a supply of water within the inner side and bottom walls 6 and 8, to be heated by a heating element 11 of any suitable form, such as a cylindrical electric resistance unit mounted surrounding the inner wall 6 near the bottom of the base 10. The current may be controlled automatically through a suitable thermostat 12 with current supplied through the cable 13. Details of the thermostat and heating element need not be further described as they form no part of the present invention.

The bowl-like base 10 may be of generally cylindrical shape, open at its top, as heretofore used in food warmers and including an upper rim 15 closing the space between the inner and outer side walls 6 and 7, and adapted to receive and support the conditioning apparatus which forms the novel part of my invention. The conditioning apparatus has, as its essential elements, an outer compartment for containing frankfurters, indicated generally at 16, surrounding an inner compartment 18 for containing bread rolls.

Referring first to the outer compartment 16, said compartment is formed in the main by a cylindrical upright outer wall 19, preferably made of transparent material, such as glass, and having its lower edge fitting in a flanged outer rim 17 of a bottom wall, indicated generally at 20. Said bottom wall is formed of sheet metal, and includes an annular, downwardly inclined floor portion 21, merging into a depending central portion 22 having upright cylindrical walls 23 which are adapted to fit telescopically within the upper end of the base 10. The tubular side walls 23 of the depending portion 22 are closed at their lower end by a generally horizontal bottom plate 24. In the form shown, said bottom wall also has a centrally disposed raised boss 25, the purpose of which is hereinafter more fully described. The inclined floor portion 21 joins the side wall 23 with a substantially horizontal shouldered portion 26 adapted to rest upon the rim 15 of the base 10, as shown in Figure 2.

A cover 30, preferably dome-shaped as shown, is fitted over and supported upon the top edge of the cylindrical side wall 19 of the outer compartment 16, being centered thereon by a depending marginal flange 31.

The inner compartment 18 consists of a cylindrical upright inner wall 35 substantially concentric with the cylindrical wall 19 of the outer compartment but of substantially less diameter than the latter, as clearly shown in Figures 1 and 2. The upright wall 35 is also preferably made of transparent material, such as glass, to display both frankfurters and buns to prospective customers. The side wall 35 of the inner compartment 18 defines the inner wall of the outer compartment 16. The top edge of said inner wall 35 is normally spaced a short distance from the under face of the domed cover 30, when the latter is in closed position on the outer wall, as shown in Figure 2.

The bottom margin of the inner side wall 35 is suitably mounted on a bottom wall 37, preferably made of sheet metal and including a circular bottom plate 38 connected to upright side walls 39 to form a depending portion 36, adapted to fit telescopically within the depending portion 22 of the outer compartment. The side walls 39 of the depending portion 36 continue upwardly into an outwardly flared shelf 40, on which the upright side wall 35 of the inner compartment is supported by a flanged rim, preferably consisting of an inwardly extending shoulder 41 and an upright terminal flange 42, as shown in Figure 2. This inwardly-shouldered, flanged rim prevents seepage of condensation from the outer surface of the side wall 35 into the interior of the inner compartment 18.

The depending central portion 36 of the inner compartment 18 has its bottom plate 38 resting on the previously mentioned upstanding boss 25 of the bottom plate 24 of the outer compartment 16, so as to form a steam or vapor chamber 45 between the telescoping circular portions 36 and 22 of said compartments. Steam or steam vapor from the base 10 is supplied to the chamber 45 through a plurality of vents 46, 46 in the bottom plate 24 surrounding the boss 25. The telescoping side walls of the depending portions 36 and 22 are loosely fitting to permit free passage of steam or vapor from the chamber 45 upwardly and outwardly into the outer compartment 16.

A greatly reduced supply of steam or steam vapor is permitted from the steam chamber 45 to the inner compartment 18 through a plurality of restricted vents 48, 48 formed in the bottom plate 38 of the inner compartment. In the form shown, only four vents 48, 48 are employed, as shown in Figure 1.

In the modified form of warming and conditioning apparatus shown in Figures 4 and 5, the structure is essentially the same as in the form shown in Figures 1, 2 and 3, with the exceptions which may be noted as follows:

The base 10a is of single-walled, cylindrical shape, including side walls 6a and bottom wall 8a. The depending central portion of the outer compartment 16, indicated at 22a, extends downwardly from the outwardly flared rim, and an annular downwardly inclined bottom wall 20a and is elongated vertically so as to extend downwardly into direct contact with a pancake-shaped heating element 11a in the bottom of the base 10a. In this form of device, therefore, the water is contained within the depending portion 22a of the outer compartment instead of being contained by the inner side and bottom walls of the base, as in the form shown in Figures 1, 2 and 3.

The depending central portion 36a of the inner compartment 18 telescopes as before within the upper end of the depending portion 22a of the outer compartment but is held in spaced relation therefrom by suitable means, herein consisting of four knobs 50, 50 formed by inward indentations provided in spaced relation around the upper edge of the side walls 23a of the lower depending portion 22a. As a result, the depending portion 36a of the inner compartment rests on the knobs 50, 50 of the lower depending portion 22a to afford free passage of steam or steam vapor from the interior of the lower depending portion 22a into the outer compartment 16.

In the form shown herein, the side walls 23a of the lower depending portion 22a may have an inwardly offset shoulder 50a below the bottom plate 38a of the inner compartment.

Steam vapor is admitted to the inner compartment 18 through a plurality of relatively small vents in the depending portion of the inner compartment. In the form shown, four vents 51, 51 are provided at equally-spaced points in the upright side walls 37a of the said depending portion. A fifth vent may also be provided at the center of the bottom plate 38a.

It will now be understood that the part of the lower depending portion 22a of the outer compartment, extending below the inner compartment, forms, in effect, a steam chamber 45a which corresponds generally with the steam chamber 45 of the form of device shown in Figures 1, 2 and 3, inclusive, excepting that steam or steam vapor is supplied by heating the water contained within the extended depending portion 22a of the second-described structure, instead of supplying the steam or steam vapor to the outer compartment through the vents 46, 46 in the bottom wall of the structure first described.

The use and operation of the apparatus shown in Figures 1 to 3 now may be described as follows:

The cover 30 is removed from the apparatus, and a supply of frankfurters 60, 60 may be placed in the outer compartment 16, and a supply of bread rolls 61, 61 are placed in the inner compartment 18. The cover is then applied to close the top of the apparatus, as shown in Figure 2. The water within the base 10 is heated to an approximate boiling point but is preferably maintained by the automatic heat control 12 so that only a sufficient amount of steam will be generated to maintain a relatively low vapor pressure within the apparatus. Any excessive generation of steam, of course, is unnecessary for maintaining the frankfurters and rolls at the desired temperature and humidity respectively. Moreover, since the cover 30 and other parts of the apparatus are not designed to be sealed, it will be understood that the apparatus is in no way intended for use as a steam pressure cooking apparatus.

One of the principal difficulties involved in the successful use of a warming apparatus of the kind, to which my invention relates, is to provide means for keeping the frankfurters in a relatively moist, warm condition and also keeping the bread rolls warm by subjecting the latter to a substantially less humid atmosphere than that surrounding the frankfurters, so that the rolls will not absorb an excessive amount of moisture and become soggy after extended periods of operation of the apparatus. This difficulty is entirely overcome in my improved apparatus, by supplying a restricted amount of vapor pressure to the inner compartment 18, both at the top and bottom thereof, sufficient to maintain the rolls at a substantially uniform moist condition, and also supplying vapor pressure from the same source to the outer compartment wherein the frankfurters are contained, so as to keep the frankfurters in an atmosphere of substantially greater humidity than the rolls in the inner compartment.

In applicant's apparatus, a considerably greater supply of vapor pressure passes from the chamber 45 into the outer compartment 16 than is applied to the bottom of the inner compartment. Moreover, since the outer compartment 16 communicates with the inner compartment in the relatively restricted space between the top rim of the inner compartment 18 and the under surface of the cover 30, there is a tendency for some of the vapors in the outer compartment 16 to pass over the top edge of the inner compartment 18 and be diffused within the inner compartment at the upper end thereof. The arrangement is such, however, that this tendency will be counterbalanced by the vapor pressure which passes into the bottom of the inner compartment through the vents 48, as previously described. Moreover, a considerable proportion of the moisture contained in the warm vapors supplied to the outer compartment becomes condensed and absorbed by the frankfurters contained in the outer compartment, and also on the outer and inner walls of said outer compartment. As a result, in practice, I find that the relative humidity at the extreme upper end of the outer compartment is considerably lower than at the lower end of the outer compartment, so that a relatively small amount of moisture will tend to be carried over the top edge of the inner compartment into the latter. This small amount of moisture is sufficient to keep the rolls in the upper part of the inner compartment in proper moist condition, while the small amount of warm vapor supplied through the restricted vents 48, 48 in the bottom of the inner compartment keep the rolls in the bottom of the inner compartment equally moist without becoming soggy.

As a further advantage of my improved apparatus, it will be understood that the vapors which pass upwardly through the frankfurters in the outer compartment tend to acquire a distinct characteristic odor from the frankfurters, which is carried over in small and yet effective quantities into the upper end of the inner compartment, to preflavor the rolls in the latter.

I have found, in practice, that the difference in relative humidity normally effective in the outer and inner compartments, as above described, is evidenced by the condensation formed on the under surface of the cover 30, while the apparatus is in operation. Most of the condensation accumulates in the annular area above the outer compartment and decreases substantially in the central area above the inner compartment. Nevertheless, any excessive condensation, accumulating over the inner compartment, particularly near its outer edge, will tend to drain downwardly along the domed under surface of the cover and be carried outwardly over the upper edge of the inner compartment for drainage into the outer compartment. In this way, any excess condensation from the cover is drained into the outer compartment, to add to the moisture desirable on the frankfurters, but quite undesirable on the rolls.

Excessive water of condensation in the outer compartment 16 is drained downwardly along the inclined floor portion 21 and returned to the steam chamber 45 by gravity and thence through the vents 46 into the water reservoir within the base 10.

Since, as previously explained, the apparatus is not intended to carry any substantial interior pressure, the various parts, making up the inner and outer compartments, can be readily taken apart for cleaning, when desired. For instance, the glass side wall 19 can be dismounted from the bottom wall portion 20. Similarly, the upright side wall 35 of the inner compartment can be dismounted from the bottom wall portion 37, so as to facilitate thorough cleansing of the apparatus, when desired.

Figure 4:
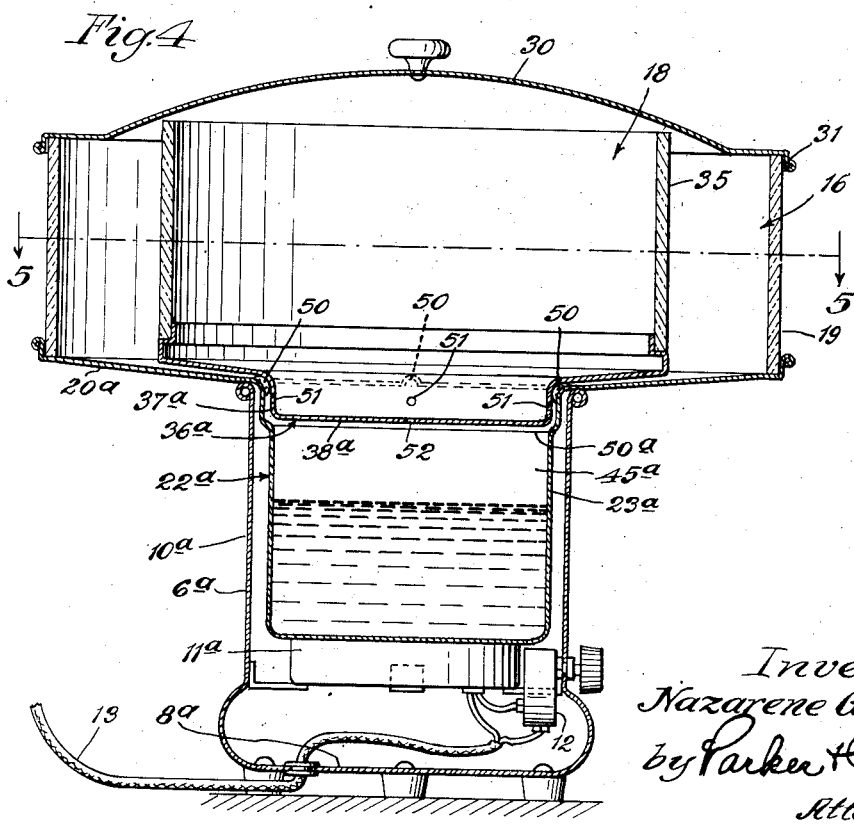
Figure 4 is a vertical section showing a modified form of apparatus made in accordance with my invention.

The use and operation of the modified form of apparatus, illustrated in Figures 4 and 5, are substantially the same as that described in connection with the form shown in Figures 1 to 3, excepting that excessive condensation from the outer compartment 16 is drained directly into the water reservoir in the chamber 45a. In this instance, steam is supplied to the chamber by heating the water contained in the extended depending portion 22a of the outer compartment.

Although I have shown and described certain structures for the purpose described, it will be understood that I do not wish to be limited to the exact constructions shown and described, but that various changes and modifications may be made without department from the spirit and scope of the invention as defined in the appended claims.

I claim:

1. In a combined frankfurter and roll warming and conditioning apparatus, an inner compartment including bottom and upright side walls and an open top, an outer compartment having an upper portion surrounding said inner compartment, said outer compartment also including bottom and upright side walls, and an open top having a removable domed closure therefor, the side walls of the inner and outer compartments being horizontally spaced, the bottom wall of said outer compartment including a centrally disposed depending portion, and said inner compartment having a centrally disposed depending portion fitting telescopically in the upper end of the centrally disposed depending portion of said outer compartment to form a steam chamber beneath said inner compartment, means for supplying steam to said steam chamber, means between the interfitting depending portions of said inner and outer compartments to permit relatively free passage of steam from said steam chamber into the upper part of said outer compartment, the bottom wall of said inner compartment having restricted vents therethrough, permitting passage of a relatively small supply of steam from said steam chamber into said inner compartment, and the upper margin of said inner compartment extending into close proximity to, but spaced from, the lower surface of said domed cover when the latter is in closed position on said outer compartment, to provide restricted communication between said inner and outer compartments at their upper ends.

2. A structure in accordance with claim 1, wherein the upright side walls of both the inner and outer compartments are made of transparent material, such as glass.

3. A structure in accordance with claim 1, wherein the means for supplying steam to the steam chamber includes a bowl-like base having an open and annularly rimmed top upon which the bottom wall of the outer compartment is removably mounted in sealing relation, with the depending portion of said outer compartment extending telescopically into said bowl-like base.

4. A structure in accordance with claim 1, wherein the upright side wall of the inner compartment consists of a continuous tubular member, and the bottom wall of said inner compartment includes an inwardly and upwardly flanged rim on which the lower edge of said tubular member is fitted, to prevent seepage of condensate from the outer surface of said tubular member into said inner compartment.

5. A structure in accordance with claim 1, wherein the under surface of said domed cover is outwardly and downwardly inclined adjacent the upper edge of the inner compartment to insure drainage of condensation on said cover into the outer compartment.

6. A structure in accordance with claim 1, wherein the effective area of the restricted vents through the bottom wall of the inner compartment and the effective area of the spacing between the upper margin of the inner compartment and the lower surface of the domed cover are such as to substantially balance the supply of steam vapor through said vents and marginal space respectively, thereby controlling the circulation of vapor through said inner compartment so that rolls or buns in the latter compartment may be kept warm and moist without becoming soggy.

7. A structure in accordance with claim 1, wherein the bottom wall of the outer compartment is flared outwardly and upwardly from its centrally disposed depending portion.

NAZARENE G. MORICI.

REFERENCES CITED

The following references are of record in the file of this patent:

UNITED STATES PATENTS

| Number | Name | Date |
| --- | --- | --- |
| 64,142 | Potwin | Apr. 23, 1867 |
| 219,388 | Comins | Sept. 9, 1879 |
| 1,711,631 | Burnett | May 7, 1929 |
| 2,053,935 | Austin | Sept. 8, 1936 |
| 2,317,214 | Poppas | Apr. 20, 1943 |